United States Patent [19]

Kobayashi et al.

[11] Patent Number: 4,521,821
[45] Date of Patent: Jun. 4, 1985

[54] OPERATING LEVER APPARATUS

[75] Inventors: Minoru Kobayashi; Shigeru Nemoto, both of Tokyo, Japan

[73] Assignee: Olympus Optical Co., Ltd., Tokyo, Japan

[21] Appl. No.: 359,857

[22] Filed: Mar. 19, 1982

[30] Foreign Application Priority Data

Mar. 30, 1981 [JP] Japan .................................. 56-46915

[51] Int. Cl.$^3$ ...................... G11B 15/48; G11B 15/18; G11B 17/00; G05G 11/00
[52] U.S. Cl. ................................ 360/137; 74/483 PB; 360/69; 360/74.1
[58] Field of Search ...................... 360/137, 128, 74.2, 360/69, 72.3, 96, 74.4, 60, 61, 62, 96.3, 74.1; 242/187, 188, 198, 204, 206, 207; 74/483 PB

[56] References Cited

U.S. PATENT DOCUMENTS

| | | | |
|---|---|---|---|
| 3,550,983 | 12/1970 | Probst | 360/96.3 |
| 3,947,895 | 3/1976 | Suzuki | 360/137 |
| 3,972,070 | 7/1976 | Fukayama | 360/74.4 |
| 4,081,849 | 3/1978 | Onishi | 74/483 PB |
| 4,172,266 | 10/1979 | Onishi | 360/137 |
| 4,176,383 | 11/1979 | Suzuki | 360/137 |
| 4,179,721 | 12/1979 | Nakazono | 360/137 |
| 4,330,801 | 5/1982 | Morinaga | 360/69 |
| 4,334,253 | 6/1982 | Motoyama | 360/137 |
| 4,348,704 | 9/1982 | Takagi | 360/137 |

FOREIGN PATENT DOCUMENTS 1261331 11/1965 Fed. Rep. of Germany .
2821744 2/1979 Fed. Rep. of Germany .

Primary Examiner—R. Martin Kilgore
Attorney, Agent, or Firm—Frishauf, Holtz, Goodman & Woodward

[57] ABSTRACT

An operating lever apparatus for use in combination with a tape recorder which may be set to various modes according to various electric signals from a signal generating means, comprises a first base plate, a second base plate disposed parallel to the first plate, a playback lever disposed between the plates and being movable between a first and second positions along the plates, the lever causing, upon arriving at the second position, the means to generate a first signal for setting the playback mode, a recording lever disposed between the plates and being movable between a first and second positions along the plates, the lever causing, upon arriving at the second position, the means to generate a second signal for setting the recording mode, a stop lever disposed between the plates and being movable between a first and second positions along the plates, a first auxiliary lever disposed between the plates and being movable between a first and second positions along the plates, the lever holding the playback lever in the second position while remaining at the first position and releasing the playback lever upon arriving at the second position, and a second auxiliary lever disposed between the plates and being moveble between a holding and releasing positions along the plates, the lever holding the recording lever in the second position while remaining at the holding position, and moving from the holding position to the releasing position as the stop lever moves from the first position to the second position, thus releasing the recording lever from the second position and then moving the first auxiliary lever from the first position to the second position and finally releasing the playback lever from the second position.

15 Claims, 8 Drawing Figures

OPERATING LEVER APPARATUS

BACKGROUND OF THE INVENTION

This invention relates to an operating lever apparatus used in an electric apparatus in which various modes are established in accordance with various electric signals produced by signal generating means, and having a function to cause the signal generating means to produce those electric signals.

Conventionally, an operating lever apparatus is provided with members which move along a direction to intersect a base plate so that various modes may be established in an electric apparatus by various electric signals produced by such cross motion of the members. The operating lever apparatus of this type, however, requires relatively complicated assembly, having difficulty in enjoying reduced manufacturing cost. Since the members which move in the direction to intersect the base plate are relatively low in force transmissibility, the operation of the operating lever apparatus requires a comparatively great force. The conventional operating lever apparatus is subject to a further drawback in that it is difficult to reduce the dimension of the electric apparatus along the direction intersecting the base plate. These drawbacks are particularly apparent in the case where the electric apparatus using the operating lever apparatus finds its essential selling point in compactness and hence in portability. As an example of such an electric apparatus, there is a tape recorder using what is called a micro cassette.

In the prior art operating lever apparatus, moreover, urging means for biasing the members or operating levers are arranged on the base plate. In many cases, such urging means are conventionally formed of compression coil springs. The dimension of a compression coil spring along the direction intersecting the base plate is larger than that of a leaf spring or torsion coil spring, comparatively. The urging means formed of compression coil springs, therefore, constitute a hindrance to the reduction of the size of the electric apparatus along the direction intersecting the base plate. These drawbacks are quite apparent again in the case where the electric apparatus using the operating lever apparatus finds its essential selling point in compactness and hence in portability.

In the prior art operating lever apparatus, furthermore, a slot extending along the moving direction of the operating levers is formed in each of the operating levers, and a pin planted on the base plate is fitted in the slot. Each operating lever is guided in movement between its first and second positions by the pin in slide contact with the peripheral surface of the slot. In order to prevent the operating levers from being reduced in strength due to the formation of the slots therein, the dimension of the operating levers of the conventional operating lever apparatus along the direction of the width of the slots cannot help being relatively large. Accordingly, it is difficult to reduce the dimension of the conventional operating lever apparatus along the direction of the width of the slots. This is also a drawback in the case where the electric apparatus using the operating lever apparatus finds its essential selling point in compactness and hence in portability.

In the prior art operating lever apparatus, moreover, the base plate and members for guiding the operating levers in movement are formed of opaque material, so that it is hard visually to perceive the operation of the operating levers. Accordingly, detection of defective parts, if any, of the operating lever apparatus during a performance test directly after assembly thereof or in case of malfunction should be a hard task. This also is a drawback especially in the case where the electric apparatus using the operating lever apparatus finds its essential selling point in compactness and hence in portability.

SUMMARY OF THE INVENTION

Accordingly it is a first object of the invention to provide an operating lever apparatus for use in combination with, for example, a tape recorder, which is low in cost, which can be operated with a relatively small force, which intersects with a base plate of a tape recorder for a short distance and which functions to set the tape recorder to recording mode without changing reproduction mode to stop mode, thereby making it possible to record data immediately on a magnetic tape, and to set the tape recorder to reproduction mode without changing recording mode to stop mode, thereby making it easy to correct data recorded on a magnetic tape.

In order to attain the first object of the invention, there is provided an operating lever apparatus for use in combination with a tape recorder which may be set to various modes according to various electric signals from a signal generating means, said apparatus comprising: a first base plate; a second base plate spaced from and disposed parallel to the first base plate; a playback lever disposed between the first and second base plates and being movable between a first position and a second position along the first and second base plates, said playback lever causing, upon arriving at the second position, the signal generating means to generate a first electric signal for setting the tape recorder to playback mode; a recording lever disposed between the first and second base plates and being movable between a first position and a second position along the first and second base plates, said recording lever causing, upon arriving at the second position, the signal generating means to generate a second electric signal for setting the tape recorder to recording mode; a stop lever disposed between the first and second base plates and being movable between a first position and a second position along the first and second base plates; a first auxiliary lever disposed between the first and second base plates and being movable between a first position and a second position along the first and second base plates, said first auxiliary lever holding the playback lever in the second position while remaining at the first position and releasing the playback lever upon arriving at the second position; and a second auxiliary lever disposed between the first and second base plates and being movable between a holding position and a releasing position along the first and second base plates, said second auxiliary lever holding the recording lever in the second position while remaining at the hold position, and moving from the holding position to the releasing position as said stop lever moves from the first position to the second position, thus releasing the recording lever from the second position and then moving the first auxiliary lever from the first position to the second position and finally releasing the playback lever from the second position.

A second object of the invention is to provide an operating lever apparatus assuring lower manufacturing cost, requiring only a relatively small operating force, and capable of further reducing the dimension of the electric apparatus along the direction to intersect the base plate.

In order to attain the second object of the invention, the operating lever apparatus of the aforementioned construction further comprises holes formed at least in the first base plate or the playback lever, the recording lever, and the stop lever, and urging means in the holes for urging the playback lever, the recording lever, and the stop lever toward their respective first positions.

A third object of the invention is to provide an operating lever apparatus assuring lower manufacturing cost, requiring only a relatively small operating force, and capable of reducing the dimension of the electric apparatus along the direction to intersect the base plate and the dimension of the operating lever apparatus along the direction of the width of the holes or slots.

In order to attain the third object, the operating lever apparatus constructed in the aforesaid manner to attain the first object further comprises guide projections formed on at least one of the first and second base plates to come into slide contact with the respective outer peripheral surfaces of at least the playback lever, the recording lever, the stop lever, and the second auxiliary operating lever, thereby guiding at least the playback lever, the recording lever, the stop lever, and the second auxiliary operating lever in the movement between the first and second positions or between the holding and releasing positions.

In order more specifically to attain the third object, in the operating lever apparatus constructed in the aforesaid manner to attain the third object, each urging means is preferably a coil spring to produce an axial urging force.

A fourth object of the invention is to provide an operating lever apparatus assuring lower manufacturing cost, requiring only relatively small operating force, and capable of facilitating the detection of defective parts, if any, of the operating lever apparatus at performance test directly after assembly thereof or in case of malfunction, as well as of reducing the length of the electric apparatus along the direction to intersect the base plate.

In order to attain the fourth object, in the operating lever apparatus constructed in the aforesaid manner to attain the first object, the second base plate is transparent.

Preferably, in the operating lever apparatus of the invention, the guide projections are formed by extrusion-molding at least one of the first and second base plates.

With such construction, the first or second base plate may be provided with the guide projections at lower cost than the cost of planting a plurality of independently formed guide projections on the first or second base plate.

Moreover, the operating lever apparatus of the invention is preferably so constructed that the playback lever, recording lever and stop lever move in the same direction from the first position to the second position and vice versa, said second auxiliary lever moves between the holding position and releasing position in the direction intersecting with the direction in which said playback, recording and stop levers move, and said first auxiliary lever is rotatable, with one end moving along a path which intersects with the direction in which said second auxiliary lever moves.

With such construction the overall length of the operating lever apparatus along the base plate may be reduced for improved compactness.

Furthermore, the operating lever apparatus of the invention is preferably so constructed that the playback lever, the recording lever, and the stop lever move along the same direction between their respective first and second positions as the direction of forces to be applied to the playback lever, the recording lever, and the stop lever to shift the same.

With such construction, the overall length of the operating lever apparatus along the base plate may be further reduced for additionally improved compactness, and the force necessary for the operation of the operating lever apparatus may be minimized.

Now an embodiment of this invention will be described in detail with reference to the accompanying drawings.

DETAILED DESCRIPTION OF THE PREFERRED EMBODIMENT

Figure 1:
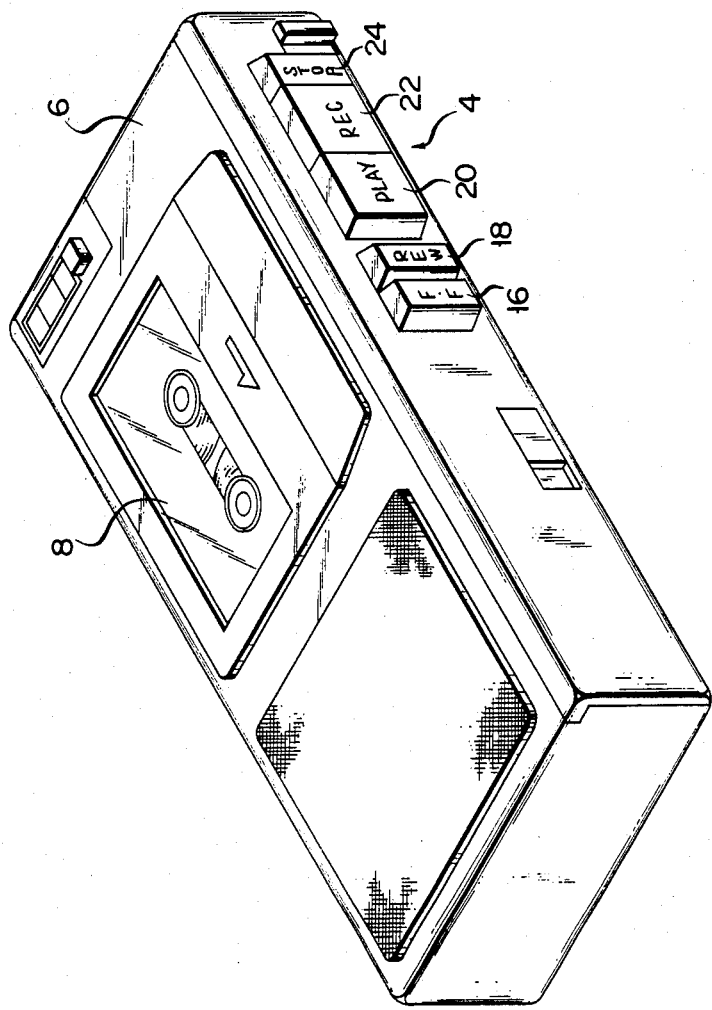
FIG. 1 is a perspective view of an electric apparatus or tape recorder provided with an operating lever apparatus according to an embodiment of this invention.

FIG. 1 shows an electric apparatus 6 provided with an operating lever apparatus 4 according to an embodiment of this invention. In this embodiment, the electric apparatus 6 is a tape recorder using what is called a micro cassette 8 advantageous for sales promotion in being compact.

Figure 2:
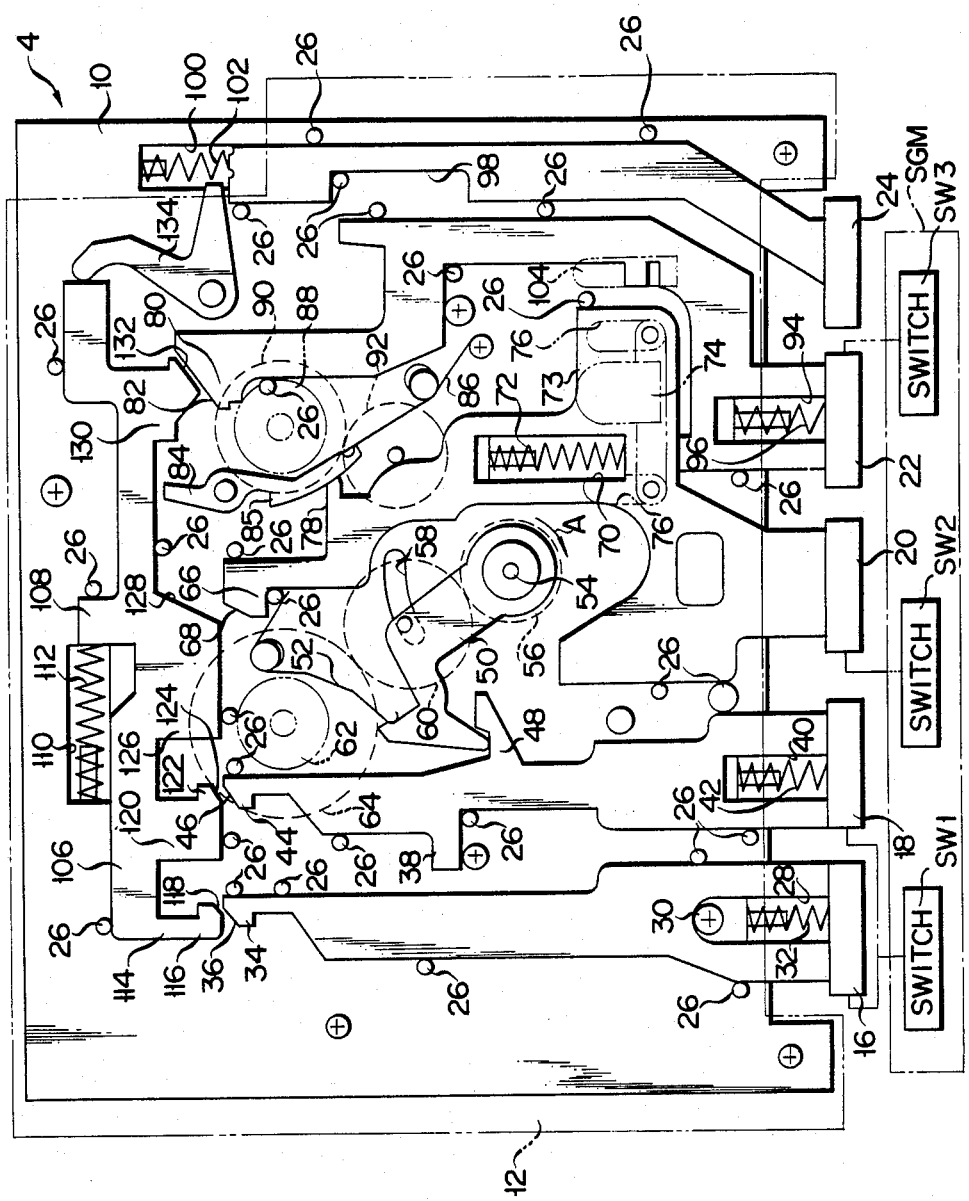
FIG. 2 is a plan view showing a state in which a plurality of operating levers of the operating lever apparatus of FIG. 1 are located in their respective first positions.

The operating lever apparatus 4 is provided with a flat base plate 10 (hereinafter referred to as a first base plate), as shown in FIG. 2, which is disposed within the housing of the electric apparatus 6. In this embodiment, the first base plate 10 is formed of metal and is hence opaque. Disposed in front of the first base plate 10 is a flat subsidiary base plate 12 (hereinafter referred to as a second base plate) separated from and parallel to the first base plate 10, as shown in FIG. 2. In this embodiment, the second base plate 12 is formed of transparent synthetic resin, and is fixed to the first base plate 10 by conventional means such as screws.

Arranged between the first and second base plates 10 and 12 are first, second, third, fourth and fifth operating levers 16, 18, 20, 22 and 24 each formed of a metal plate. Although the operating levers are five in number in this embodiment, it is necessary only that two or more operating levers be used according to the spirit of this invention. In FIG. 2, the first to fifth operating levers 16, 18, 20, 22 and 24 are shown as elongated plates extending upward in parallel with one another. The respective lower ends of the first to fifth operating levers 16, 18, 20, 22 and 24 project from the lower edges of the first and second base plates 10 and 12 into the outside space, as shown in FIG. 2, and also from the housing of the electric apparatus 12 to the outside space, as shown in FIG. 1. These projected lower ends are arranged within a plane. The positions of the first to fifth operating levers 16, 18, 20, 22 and 24 in this state are defined as their first positions.

A plurality of guide projections 26 are formed on the front of the first base plate 10. In this embodiment, these guide projections 26 are formed by extrusion molding out of the first base plate 10. The cost of the extrusion molding is lower than the cost of planting the guide projections 26 in the front of the first base plate 10.

As shown in FIG. 2, some of the guide projections 26 are in contact with the respective vertically extending edges of the first to fifth operating levers 16, 18, 20, 22 and 24. Having their vertical edges in slide contact with the guide projections 26, therefore, the first to fifth operating levers 16, 18, 20, 22 and 24 are guided in vertical movement by the guide projections 26.

As shown in FIG. 2, a vertically extending slot 28 is formed at the lower end portion of the first operating lever 16. In contact with the upper end of the slot 28 is a stopper 30 formed on the first base plate 10. An urging means 32 is disposed inside the slot 28. In this embodiment, the urging means 32 is formed of a compression coil spring, whose upper and lower ends abut on the lower edge of the first base plate 10 and the lower end of the slot 28 of the first operating lever 16, respectively. The urging means 32 urges the first operating lever 16 toward its first position shown in FIG. 2. The diameter of the urging means 32 is only a little greater than the sum of the respective thicknesses of the first base plate 10 and the first operating lever 16. Therefore, the urging means 32 protrudes only slightly from the back of the first base plate 10.

As shown in FIG. 2, a leftwardly projecting first engaging portion 34 is formed at the upper end portion of the first operating lever 16. The intersectional part between the upper end face and left side face of the first engaging portion 24 is chamfered to form a first slant face 36.

A leftwardly projecting shift regulation member 38 is formed substantially in the middle of the left side face of the second operating lever 18 between the upper and lower ends thereof. As shown in FIG. 2, the lower end face of the shift regulation member 38 is in contact with one of the guide projections 26. As shown in FIG. 2, a vertically extending slot 40 is formed at the lower end portion of the second operating lever 18. An urging means 42 is disposed inside the slot 40. In this embodiment, the urging means 42 is formed of a compression coil spring, whose upper and lower ends abut on the lower edge of the first base plate 10 and the lower end of the slot 40 of the second operating lever 18, respectively. The urging means 42 urges the second operating lever 18 toward its first position. The diameter of the urging means 42 is only a little greater than the sum of the respective thicknesses of the first base plate 10 and the second control lever 18. Therefore, the urging means 42 protrudes only slightly from the back of the first base plate 10.

As shown in FIG. 2, a leftwardly projecting second engaging portion 44 is formed at the upper end portion of the second operating lever 18. The intersectional part between the upper end face and left side face of the second engaging portion 44 is chamfered to form a second slant face 46.

A rightwardly extending control arm portion 48 is formed substantially in the middle of the left side face of the second operating lever 18 between the upper and lower ends thereof.

As shown in FIG. 2, a first rotating lever 50 is disposed between the right side face of the second operating lever 18 and the left side face of the third operating lever 20. One end of the first rotating lever 50 is pivotally mounted on the front of the first base plate 10 below the control arm portion 48 of the second operating lever 18, and the other end is in contact with the upper end face of the control arm portion 48. The position of the first rotating lever 50 in this state is defined as its first position. The first rotating lever 50 is urged toward the first position by an urging means 52 interposed between the first and second base plates 10 and 12, as shown in FIG. 2. In this embodiment, the urging means 52 is formed of a torsion coil spring, whose longitudinal dimension (in FIG. 2) is smaller than that of the compression coil spring.

As shown in FIG. 2, a capstan 54 is rotatably mounted on the first base plate 10 in a position corresponding to the rotation axis of the first rotating lever 50. The capstan 54 is rotated by an electric motor (not shown). Behind the first base plate 10, a first gear 56 is concentrically fixed to the capstan 54. A backwardly extending shaft is fixed to the substantially middle part of the first rotating lever 50. This shaft is passed through a slot 58 formed in the first base plate 10 and in the shape of a partial circular arc described around the capstan 54, and is rotatably fitted at the rear end with a second gear 60 in mesh with the first gear 56.

Between the upper end portions of the right side face of the second operating lever 18 and the left side face of the third operating lever 20, as shown in FIG. 2, a first reel shaft 62 is rotatably mounted on the first base plate 10. The forward end of the first reel shaft 62 penetrates the second base plate 12 to be located ahead of the front of the second base plate 12. Behind the first base plate 10, as shown in FIG. 2, a third gear 64 in mesh with the second gear 60 is concentrically fixed to the rear end of the first reel shaft 62.

As shown in FIG. 2, a leftwardly projecting third engaging portion 66 is formed at the upper end portion of the third operating lever 20. The intersectional part between the upper end face and left side face of the third engaging portion 66 is chamfered to form a third slant face 68. The lower end face of the third engaging portion 66 is in contact with one of the guide projections 26.

As shown in FIG. 2, a vertically extending slot 70 is formed in the third operating lever 20. Slots with the same shape and size of the slot 70 are formed in those portions of the first and second base plates 10 and 12 which face the slot 70, severally. An urging means 72 is disposed inside the slot 70 of the third operating lever 20 and the slots of the first and second base plates 10 and 12. In this embodiment, the urging means 72 is formed of a compression coil spring, whose upper and lower ends abut on the upper end of the slot of the first base plate 10 and the lower end of the slot 70 of the third operating lever 20, respectively. The urging means 72 urges the third operating lever 20 toward its first position. The diameter of the urging means 72 is only a little greater than the sum of the respective thicknesses of the first base plate 10 and the third operating lever 20. Therefore, the urging means 72 protrudes only slightly from the back of the first base plate 10.

As shown in FIG. 2, a rightwardly extending support portion 73 is formed on the right side face of the third operating lever 20 at the lower portion thereof. A magnetic head 74 is disposed in front of that portion of the second base plate 12 which faces the support portion 73. The magnetic head 74 is fixed on the front of the third operating lever 20 by means of legs inserted in two vertically extending slots 76 in the second base plate 12. As shown in FIG. 2, a rightwardly extending small engaging projection 78 is formed on the right side face of the third operating lever 20 at the upper portion thereof.

As shown in FIG. 2, the fourth operating lever 22 is crank-shaped. The support portion 73 of the third operating lever 20 is located in the lower end region of a recess of the fourth operating lever 22. The lower end face of an upper horizontally extending portion of the fourth operating lever 22 is in contact with one of the guide projections 26. The upper end face of a lower horizontally extending portion of the fourth operating lever 22 is in contact with the lower end face of the support portion 73 of the third operating lever 20.

As shown in FIG. 2, a leftwardly projecting fourth engaging portion 80 is formed at the upper end portion of the fourth operating lever 22. The intersectional part between the upper end face and left side face of the fourth engaging portion 80 is chamfered to form a fourth slant face 82.

As shown in FIG. 2, a first auxiliary operating lever 84 is disposed between the respective upper end portions of the right side face of the third operating lever 20 and the left side face of the fourth operating lever 22. Pivotally mounted on the first base plate 10 substantially at the center, the first auxiliary operating lever 84 can rotate along the front of the first base plate 10. As shown in FIG. 2, one end of the first auxiliary operating lever 84 is located above the upper end face of the third operating lever 20. The left side face of the other end of the first auxiliary operating lever 84 is in contact with the right side face of the small engaging projection 78 of the third operating lever 20. An engaged recess 85 is formed in the left side face of the first auxiliary operating lever 84 between the center of rotation and the other end of thereof. The position of the first auxiliary operating lever 84 in this state is defined as its first position. The first auxiliary operating lever 84 is urged toward the first position by an urging means 86 interposed between the first and second base plates 10 and 12, as shown in FIG. 2. In this embodiment, the urging means 86 is formed of a torsion coil spring, whose longitudinal dimension (FIG. 2) is smaller than that of the compression coil spring.

Between the first auxiliary operating lever 84 and the upper end portion of the fourth operating lever 22, as shown in FIG. 2, a second reel shaft 88 is rotatably mounted on the first base plate 10. The forward end of the second reel shaft 88 penetrates the second base plate 12 to be located ahead of the front of the second base plate 12. Behind the first base plate 10, as shown in FIG. 2, a fourth gear 90 is concentrically fixed to the rear end of the second reel shaft 88. Under the fourth gear 90 of the second reel shaft 88, a fifth gear 95 in mesh with the fourth gear 90 is rotatably attached to the back of the first base plate 10. The fifth gear 92 is located within the locus of movement of the second gear 60 which moves as the first rotating lever 50 rotates clockwise.

As shown in FIG. 2, a vertically extending slot 94 is formed at the lower end portion of the fourth operating lever 22. An urging means 96 is disposed inside the slot 94. In this embodiment, the urging means 96 is formed of a compression coil spring, whose upper and lower ends abut on the lower edge of the first base plate 10 and the lower end of the slot 94 of the fourth operating lever 22, respectively. The urging means 96 urges the fourth operating lever 22 toward its first position shown in FIG. 2. The diameter of the urging means 96 is only a little greater than the sum of the respective thicknesses of the first base plate 10 and the fourth operating lever 22. Therefore, the urging means 96 protrudes only slightly from the back of the first base plate 10.

As shown in FIG. 2, a vertically extending notch 98 is formed in the left side face of the fifth operating lever 24. The upper end face of the notch 98 is in contact with one of the guide projections 26. A slot 100 extends upward from that portion of the first base plate 10 which faces the upper end face of the fifth operating lever 24. That portion of the second base plate 12 which faces the slot 100 is notched, as shown in FIG. 2. An urging means 102 is disposed inside the slot 100. In this embodiment, the urging means 102 is formed of a compression coil spring, one and the other ends of which abut on the upper end face of the slot 100 and the upper end face of the fifth operating lever 24, respectively. The urging means 102 urges the fifth operating lever 24 toward its first position shown in FIG. 2. The diameter of the urging means 102 is only a little greater than the sum of the respective thicknesses of the first base plate 10 and the fifth operating lever 24. Therefore, the urging means 102 protrudes only slightly from the back of the first base plate 10.

On the right of the magnetic head 74, as shown in FIG. 2, an erasing head 104 is mounted on the front of the fourth operating lever 22. In this embodiment, the erasing head 104 is formed of a permanent magnet. The erasing head 104 penetrates a vertically extending slot (not shown) in the second base plate 12 to project into the outside space, and is located ahead of the front of the second base plate 12.

Over the upper end faces of the first to fourth operating levers 16, 18, 20 and 22 and the one end of the first auxiliary operating lever 84, as shown in FIG. 2, a second auxiliary operating lever 106 formed of a flat metal plate is disposed between the first and second base plates 10 and 12. The second auxiliary operating lever 106 has a horizontally elongated shape, as shown in FIG. 2.

As shown in FIG. 2, some of the guide projections 26 are in contact with the horizontally extending edges of the second auxiliary operating lever 106. Having its horizontal edges in slide contact with the guide projections 26, therefore, the second auxiliary operating lever 106 is guided in horizontal movement by the guide projections 26.

As shown in FIG. 2, an upwardly projecting portion 108 is formed on the upper edge of the second auxiliary operating lever 106. One of the guide projections 26 is in contact with the right side face of the upwardly projecting portion 108. The position of the second auxiliary operating lever 106 in this state is defined as its first position or releasing position.

Formed in the first base plate 10 is a slot 110 extending to the left from that portion of the first base plate 10 which faces the left side face of the upwardly projecting portion 108. A slot with the same shape and size of the slot 110 is formed in that region of the second base plate 12 which faces the slot 110. An urging means 112 is disposed inside the slot 110. In this embodiment, the urging means 112 is formed of a compression coil spring, one and the other ends of which abut on the left end of the slot 110 of the first base plate 10 and the left side face of the upwardly projecting portion 108 of the second auxiliary operating lever 106. The urging means 112 urges the second auxiliary operating lever 106 toward its first position. The diameter of the urging means 112 is only a little greater than the sum of the respective thicknesses of the first base plate 10 and the second auxiliary operating lever 106. Therefore, the urging means 112 protrudes only slightly from the back of the first base plate 10.

As shown in FIG. 2, a downwardly projecting first hanging portion 114 is formed at the left end portion of the second auxiliary operating lever 106. A rightwardly projecting first engaged portion 116 is formed at the lower end portion of the first hanging portion 114. The intersectional part between the lower end face and right side face of the first engaged portion 116 is chamfered to form a first auxiliary slant face 118. The first auxiliary slant face 118 is vertically opposed to the first slant face 36 of the first operating lever 16.

Formed on the lower edge of the second auxiliary operating lever 106 is a second hanging portion 120 which projects downward from the position facing the upper end face of the second operating lever 18. As shown in FIG. 2, the left side face of the second hanging portion 120 is separated from the right side face of the first engaged portion 116 of the first hanging portion 114. The distance between the left side face of the second hanging portion 120 and the right side face of the first engaged portion 116 is greater than the distance from the right side face of the upper end portion of the first operating lever 16 to the left side face of the first engaging portion 34. The lower end face of the second hanging portion 120 extends horizontally, and is located at a level a little higher than the level of the upper end face of the first operating lever 16. As shown in FIG. 2, a rightwardly projecting second engaged portion 122 is formed on the right side face of the second hanging portion 120. The intersectional part between the right side face and lower end face of the second engaged portion 122 is chamfered to form a second auxiliary slant face 124. The second auxiliary slant face 124 is vertically opposed to the second slant face 46 of the second operating lever 18.

Between the right side face of the upper end portion of the second operating lever 18 and the left side face of the third engaging portion 66 of the third operating lever 20, a downwardly projecting third hanging portion 126 is formed on the lower edge of the second auxiliary operating lever 106. As shown in FIG. 2, the left side face of the third hanging portion 126 is separated from the right side face of the second engaged portion 122 of the second hanging portion 120.

The distance between the left side face of the third hanging portion 126 and the right side face of the second engaged portion 122 of the second hanging portion 120 is greater than the distance from the right side face of the upper end portion of the second operating lever 18 to the left side face of the second engaging portion 44. The lower end face of the third hanging portion 126 extends horizontally, and is located at a level a little higher than the level of the upper end face of the second operating lever 18.

As shown in FIG. 2, the right side face of the third hanging portion 126 is inclined to form a third auxiliary slant face 128. The third auxiliary slant face 128 is vertically opposed to the third slant face 68 of the third engaging portion 66 of the third operating lever 20.

Formed on the lower edge of the second auxiliary operating lever 106 is a fourth hanging portion 130 which projects downward from the position facing the upper end face of the fourth operating lever 22. As shown in FIG. 2, the left end face of the fourth hanging portion 130 faces the right side face of the one end of the first auxiliary operating lever 84 with a given horizontal space between them. The lower end face of the fourth hanging portion 130 is in the shape of a triangle with its vertex downward, the right side portion of the lower end face forming a fourth auxiliary slant face 132. The fourth auxiliary slant face 132 is horizontally separated from the fourth slant face of the fourth operating lever 22.

A substantially L-shaped second rotating lever 134 is disposed between the upper end portion of the fourth operating lever 22 and the upper end portion of the fifth operating lever 24. Pivotally mounted in the middle on the front of the first base plate 10, the second rotating lever 134 can rotate along the front of the first base plate 10. One end of the second rotating lever 134 abuts on the right end face of the second auxiliary operating lever 106, while the other end abuts on the upper end face of the fifth operating lever 24.

The first and second operating levers 16, 18 are coupled by conventional means to a first operating switch SW1 contained in the housing of the electric apparatus 12. When the first or second operating lever 16 or 18 is shifted from its first position against the urging force of the urging means 32 or 42, the first operating switch SW1 produces a first electric signal to rotate the aforesaid electric motor (not shown) in one direction at a relatively high speed, thereby rotating the capstan 54 and the first gear 56 in the direction of an arrow A of FIG. 2 at a relatively high speed.

The third operating lever 20 is coupled by conventional means to a second operating switch SW2 contained in the housing of the electric apparatus 12. When the third operating lever 20 is shifted from its first position against the urging force of the urging means 72, the second operating switch SW2 produces a second electric signal to rotate the electric motor in the one direction at a relatively low and constant speed, thereby rotating the capstan 54 and the first gear 56 in the direction of the arrow A at a relatively low and constant speed. At the same time, the second operating switch SW2 enables the magnetic head 74 to function as a reproducing head.

The fourth operating lever 22 is coupled to a third operating switch SW3 contained in the housing of the electric apparatus 12. When the fourth operating lever 22 is shifted from its first position against the urging force of the urging means 96, the third operating switch SW3 produces a third electric signal to cause the magnetic head 74 to function as a recording head. In this embodiment, the first, second and third operating switches SW1, SW2 and SW3 constitute a signal generating means SGM.

There will now be described the operation of the operating lever apparatus 4 of the above-mentioned construction.

Figure 3:
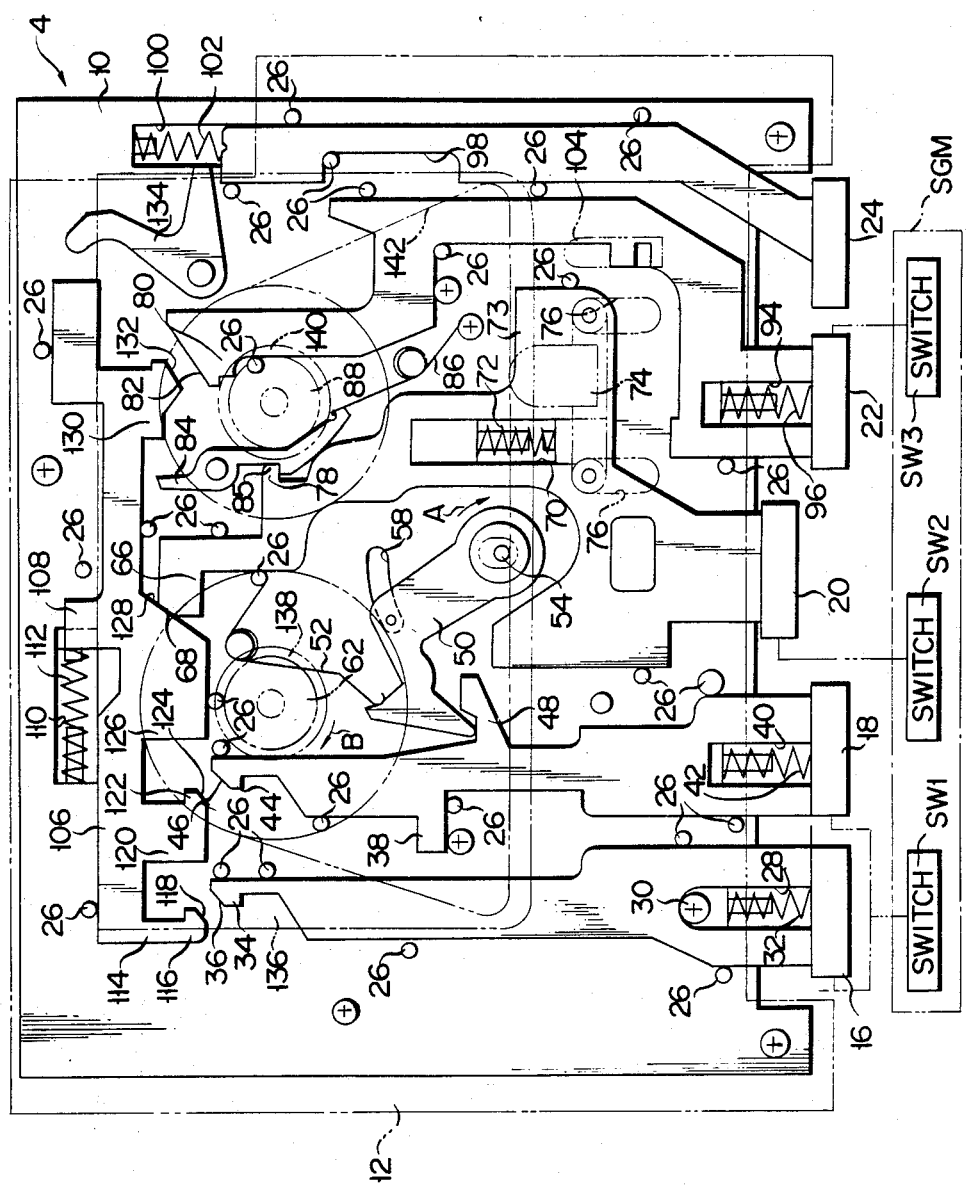
FIG. 3 is a plan view showing a state in which a pair of reel hubs of a tape cassette are mounted on a pair of reel shafts provided on the operating lever apparatus of FIG. 2, and a third operating lever serving as a playback lever is located in its second position.

As shown in FIG. 3, the first and second reel shafts 62 and 88 are mounted with first and second reel hubs 138 and 140, respectively, of a tape cassette 136. At this time, the capstan 54 is in contact with the back of a magnetic recording tape 142 of the tape cassette 136 in a position along the housing of the tape cassette 136 in the middle of the tape path from the first reel hub 138 to the second reel hub 140.

If the third operating lever 20 is pressed upward, it moves upward from its first position of FIG. 2 against the urging force of the urging means 72. The third slant face 68 of the third operating lever 20 moving upward comes into slide contact with the third auxiliary slant face 128 of the second auxiliary operating lever 106, thereby causing the second auxiliary operating lever 106 to move from its first position to the left against the urging force of the urging means 112. At the same time, the small engaging projection 78 of the third operating lever 20 comes into slide contact with the left side face of the other end of the first auxiliary operating lever 84. Then, when the small engaging projection 78 gets engaged with the engaged with the engaged recess 85 of the first auxiliary operating lever 84, as shown in FIG. 3, the third operating lever 20 ceases to move upward. The position of the third operating lever 20 in this state is defined as its second position. And the position of the first auxiliary operating lever 84 at this time is the first position of its described above, wherein the first auxiliary operating lever 84 holds the third operating lever 20 at its second position.

The horizontal position of the second auxiliary operating lever 106 as shown in FIG. 3, in which the third operating lever 20 is located in its second position, is defined as its second position.

When the third operating lever 20 is located in the second position, the second operating switch SW2 causes the electric motor to rotate the capstan 54 clockwise or in the direction of the arrow A of FIG. 3 at a relatively slow, constant speed. The rotation of the capstan 54 is transmitted to the first reel shaft 62 through the first to third gears 56, 60 and 64 shown in FIG. 2, thereby rotating the first reel shaft 62 in the direction of an arrow B. When the third operating lever 20 is located in the second position, moreover, a pinch roller (not shown) is caused to abut on the surface of the magnetic recording tape 142. In conjunction with the capstan 54, the pinch roller holds the magnetic recording tape 142. Thus, the magnetic recording tape 142 is wound on the first reel hub 138 after it is drawn out from the side of the second reel hub 140 by means of the capstan 54 and the pinch roller.

When the third operating lever 20 is located in the second position, furthermore, the magnetic head 74 abuts on the surface of the magnetic recording tape 142, as shown in FIG. 3, and the second operating switch SW2 causes the magnetic head 74 to function as the reproducing head. When the third operating lever 20 is located in the second position, therefore, information previously recorded on the magnetic recording tape 142 is reproduced therefrom by the magnetic head 74 as the tape 142 is run from the second reel hub 140 to the first reel hub 138 at a constant speed. Thus, a playback mode is established in the tape recorder as the electric apparatus 6 provided with the operating lever apparatus 4 of this embodiment. This means that the third operating lever 20 functions as a playback lever in the tape recorder.

When the second auxiliary operating lever 106 is located in its second position, the loci of upward movement of the right side face of the upper end portion of the first operating lever 16 and the left side face of the first engaging portion 34 are located between the right side face of the engaged portion 116 of the first hanging portion 114 of the second auxiliary operating lever 106 and the left side face of the second hanging portion 120, as shown in FIG. 3. Further, the loci of upward movement of the right side face of the upper end portion of the second operating lever 18 and the left side face of the second engaging portion 44 are located between the right side face of the second engaged portion 122 of the second hanging portion 120 of the second auxiliary operating lever 106 and the left side face of the third hanging portion 126, as shown in FIG. 3. When the third operating lever 20 is located in its second position, therefore, the first or second operating lever 16 or 18 can be shifted upward from its first position against the urging force of the urging means 32 or 42.

When the first operating lever 16 is moved upward from its first position against the urging force of the urging means 32, the first operating switch SW1 causes the electric motor to rotate in the one direction at relatively high speed, thereby rotating the capstan 54 and the first gear 56 in the direction of the arrow A of FIG. 3 at relatively high speed. As the first operating lever 16 is shifted upward from the first position, moreover, the pinch roller is separated from the magnetic recording tape 142 of the tape cassette 136. Also, the magnetic recording tape 142 is released from the cooperative hold by the pinch roller and the capstan 54. The relatively fast rotation of the first gear 56 in the direction of the arrow B is transmitted to the third gear 64 through the second gear 60. Since the third gear 64 then rotates in the direction of the arrow B of FIG. 3 at relatively high speed, the magnetic recording tape 142 of the tape cassette 136 is fed fast from the second reel hub 140 to the first reel hub 138. Thus, a fast-forward mode is established in the tape recorder as the electric apparatus 6 provided with the operating lever apparatus 4 of this embodiment. This means that the first operating lever 16 functions as a fast-forward lever in the tape recorder.

When the magnetic recording tape 142 is fed fast from the second reel hub 140 to the first reel hub 138 in the aforesaid manner, the magnetic head 74 serving as the playback head is in contact with the magnetic recording tape 142, as shown in FIG. 3. Accordingly, playback operation may be performed concurrently with fast-forward operation.

If the upward pressure on the first operating lever 16 is removed, the first operating lever 16 is caused to move downward by the urging force of the urging means 32. When the stopper 30 abuts on the upper end of the slot 28, that is, when the first operating lever 16 is located in its first position, the first operating lever 16 ceases to move downward. When the first operating lever 16 is thus located in the first position, the electric motor rotates in the one direction at relatively low and constant speed to cause the capstan 54 to rotate clockwise or in the direction of the arrow A of FIG. 3 at relatively low, constant speed. Also, the pinch roller is brought again into contact with the surface of the magnetic recording tape 142 to hold the same between itself and the capstan 54. Thereafter, in the same manner as in the case where only the third operating lever 20 is located in its second position, the magnetic recording tape 142 is run from the second reel hub 140 to the first reel hub 138 at a constant speed, and information previously recorded on the magnetic recording tape 142 is reproduced therefrom by the magnetic head 74.

Figure 8:
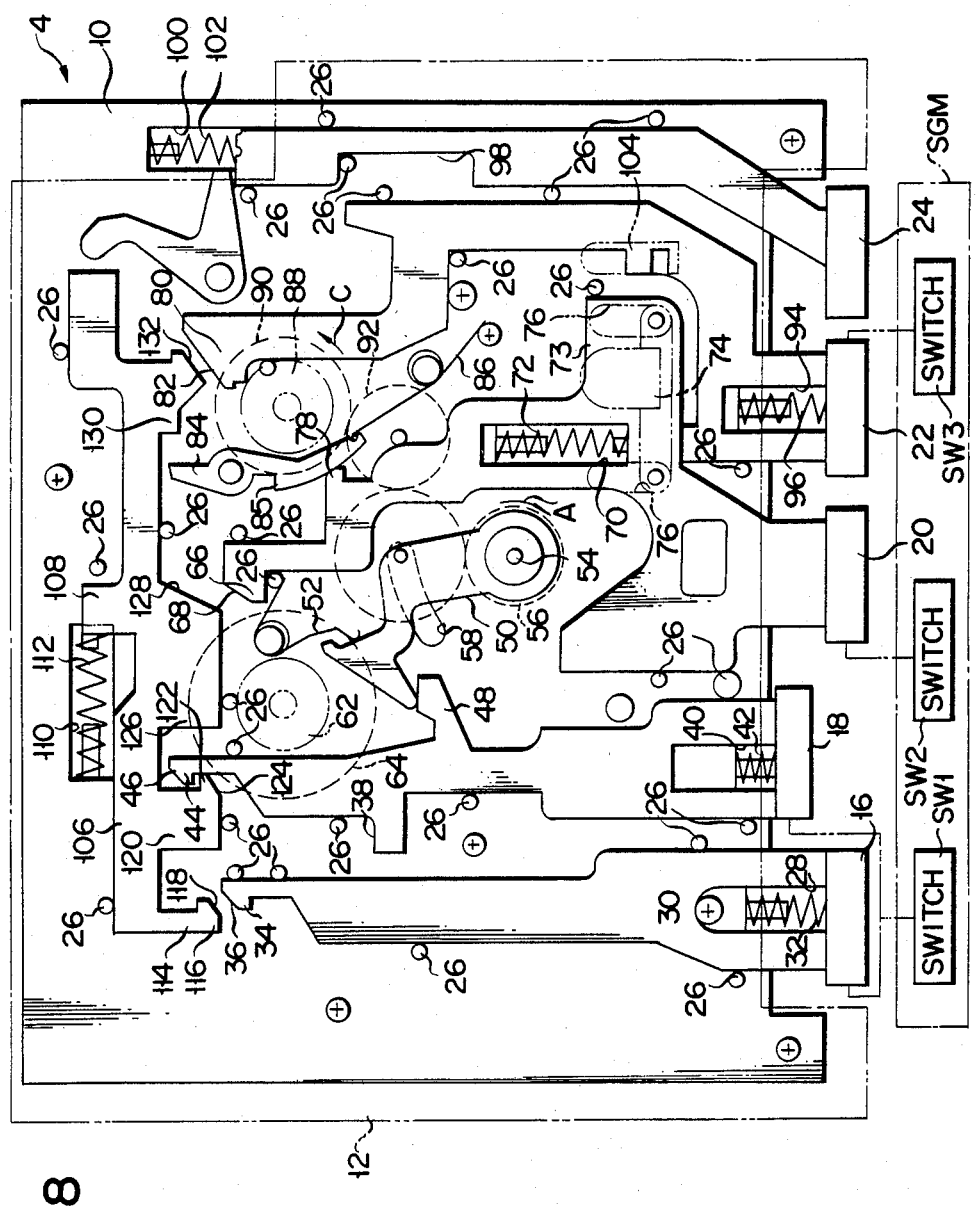
FIG. 8 is a plan view showing a state in which the pair of reel hubs of the tape cassette are mounted on the pair of reel shafts provided on the operating lever apparatus of FIG. 2, and a second operating lever serving as a fast rewinding lever is located in its second position.

When the second operating lever 18 is moved upward from its first position against the urging force of the urging means 42, the control arm portion 48 of the second operating lever 18 causes the first rotating lever 50 to rotate clockwise from its first position against the urging force of the urging means 52. When the second gear 60 engages the fourth gear 90, as shown in FIG. 8, the first rotating lever 50 stops the aforesaid rotation. The position of the first rotating lever 50 in this state is defined as its second position.

When the second operating lever 18 is moved upward from its first position against the urging force of the urging means 42, the electric motor rotates in the one direction at relatively high speed to cause the capstan 54 and the first gear 56 to rotate in the direction of the arrow A of FIG. 3 at relatively high speed. As the second operating lever 18 is shifted upward from the first position, moreover, the pinch roller is separated from the magnetic recording tape 142 of the tape cassette 136. Also, the magnetic recording tape 142 is released from the cooperative hold by the pinch roller and the capstan 54. The relatively fast rotation of the first gear 56 in the direction of the arrow A is transmitted to the fourth gear 90 through the second gear 60. Since the fifth gear 92 then rotates in the direction of an arrow C of FIG. 8 at relatively high speed, the magnetic recording tape 142 of the tape cassette 136 is rewound fast from the first reel hub 138 to the second reel hub 140. Thus, a fast rewinding mode is established in the tape recorder as the electric apparatus 6 provided with the operating lever apparatus 4 of this embodiment. This means that the second operating lever 18 functions as a fast rewinding lever in the tape recorder.

When the magnetic recording tape 142 is rewound fast from the first reel hub 138 to the second reel hub 140 in the aforesaid manner, the magnetic head 74 serving as the playback head is in contact with the magnetic recording tape 142, as shown in FIG. 3. Accordingly, playback operation may be performed concurrently with fast rewinding operation.

If the upward pressure on the second operating lever 18 is removed, the second operating lever 18 is caused to move downward by the urging force of the urging means 42. When the lower end face of the shift regulation member 38 abuts on the guide projection 26, that is, when the second operating lever 18 is located in its first position of FIG. 2, the second operating lever 18 ceases to move downward. When the second operating lever 18 is thus located in the first position, the first operating lever 50 is returned to its first position of FIG. 3 by the urging force of the urging means 52, and the electric motor rotates in the one direction at relatively low speed to cause the capstan 54 to rotate clockwise or in the direction of the arrow A of FIG. 3 at relatively low, constant speed. Also, the pinch roller is brought again into contact with the surface of the magnetic recording tape 142 to hold the same between itself and the capstan 54. Thereafter, in the same manner as in the case where only the third operating lever 20 is located in its second position, the magnetic recording tape 142 is run from the second reel hub 140 to the first reel hub 138 at a relatively slow and constant speed, and information previously recorded on the magnetic recording tape 142 is reproduced therefrom by the magnetic head 74.

Figure 4:
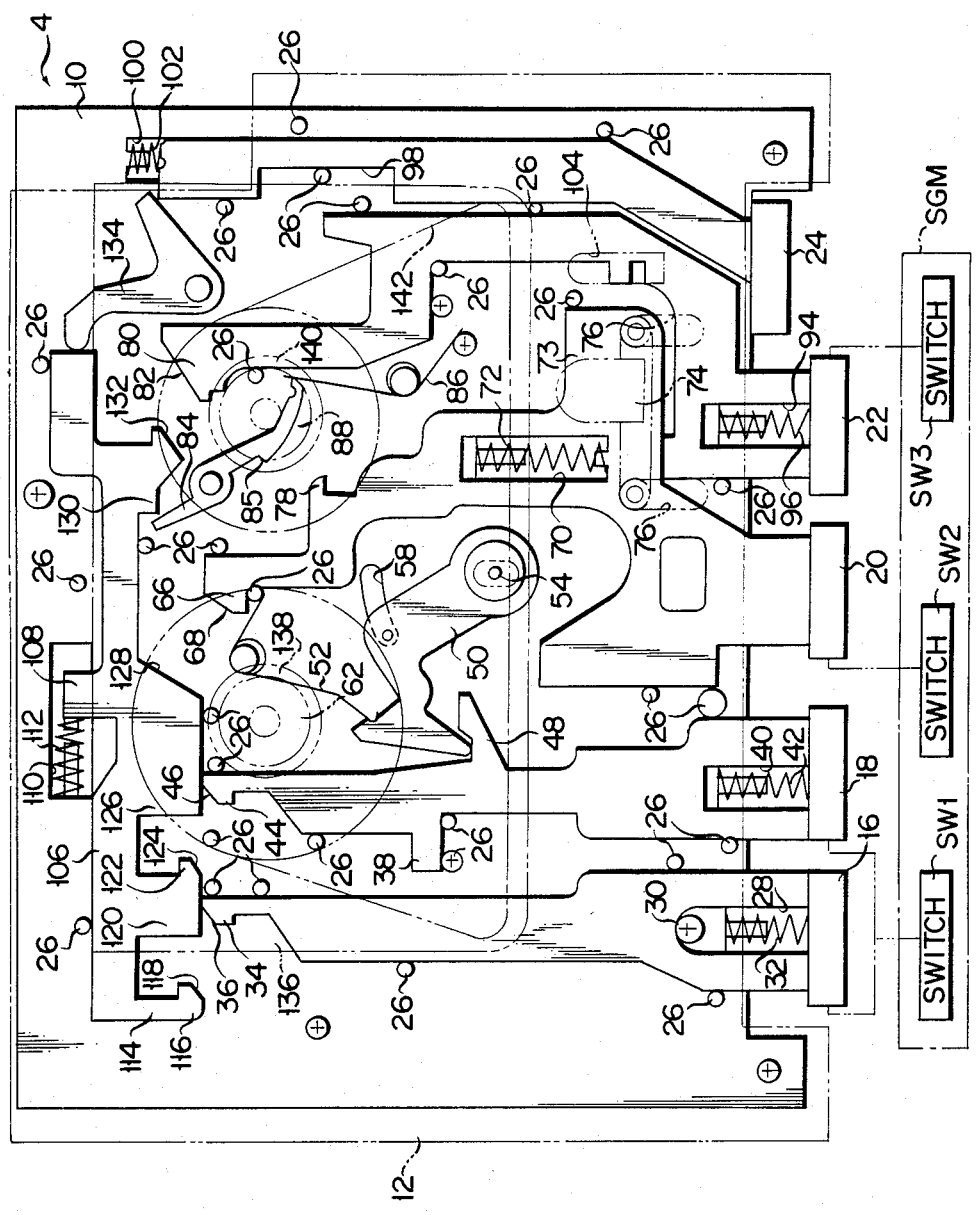
FIG. 4 is a plan view showing a state in which the pair of reel hubs of the tape cassette are mounted on the pair of reel shafts provided on the operating lever apparatus of FIG. 2, and a fifth operating lever serving as a stop lever is located in its second position.

If the fifth operating lever 24 is pressed upward from its first position against the urging force of the urging means 102 when the third operating lever 20 is in its second position, the second auxiliary operating lever 106 is moved from its second position to the left against the urging force of the urging means 112 by the second rotating lever 134, as shown in FIG. 4. The left side face of the fourth hanging portion 130 of the second auxiliary operating lever 106 thus moved to the left of the second position, as shown in FIG. 4, abuts on the right side face of the one end of the first auxiliary operating lever 84, thereby causing the first auxiliary operating lever 84 to rotate counterclockwise against the urging force of the urging means 86. When the first auxiliary operating lever 84 thus rotates in the counterclockwise direction, the small engaging projection 78 of the third operating lever 20 is disengaged from the engaged recess 85 of the first auxiliary operating lever 84, and the holding of the third operating lever 20 at its second position is released, as shown in FIG. 4. The position of the first auxiliary operating lever 84 is the second position of the first auxiliary operating lever, and the position of the second auxiliary operating lever 106 at this time is the releasing position of the second auxiliary operating lever 106. And, the third operating lever 20 is moved downward by the urging force of the urging means 72. When the lower end face of the third engaging portion 66 abuts on the guide projection 26, the third operating lever 20 stops such movement. The position where the third operating lever 20 stops the downward movement is the first position thereof.

When the third operating lever 20 is located in its first position, the second operating switch SW2 stops the rotation of the electric motor, and disables the magnetic head 74 separated from the magnetic recording tape 142 of the tape cassette 136, as shown in FIG. 4, from functioning as the reproducing head. Thus, a stop mode is established in the tape recorder as the electric apparatus 6 provided with the operating lever apparatus 4 of this embodiment. This means that the fifth operating lever 24 functions as a stop lever in the tape recorder.

If the upward pressure on the fifth operating lever 24 to counter the urging force of the urging means 102 is removed, the fifth operating lever 24 is moved downward by the urging force of the urging means 102. When the upper end face of the notch 98 of the fifth operating lever 24 abuts on the guide projection 26, that is, when the fifth operating lever 24 is located in its first position of FIG. 1, the fifth operating lever 24 ceases to move downward. As the fifth operating lever 24 moves from the second position to the first position, the second auxiliary operating lever 106 is moved to the right by the urging force of the urging means 112. Then, when the right side face of the upwardly projecting portion 108 of the second auxiliary operating lever 106 abuts on the guide projection 26, that is, when the second auxiliary operating lever 106 is located in its first position of FIG. 2, the second auxiliary operating lever 106 ceases to move to the right.

Subsequently, if the fourth operating lever 22 is pressed upward, it moves upward from its first position against the urging force of the urging means 96. When the fourth operating lever 22 moves upward, the upper end face of the lower horizontally extending portion of the fourth operating lever 22 abuts on the lower end face of the support portion 73 of the third operating lever 20. Accordingly, the third operating lever 20 also moves upward from its first position against the urging force of the urging means 72. The fourth slant face 82 of the fourth operating lever 22 moving upward comes into slide contact with the fourth auxiliary slant face 132 of the second auxiliary operating lever 106 before the third slant face 68 of the third operating lever 20 comes into slide contact with the third auxiliary slant face 128 of the second auxiliary operating lever 106, thereby causing the second auxiliary operating lever 106 to move from its first position to the left against the urging force of the urging means 112.

Figure 5:
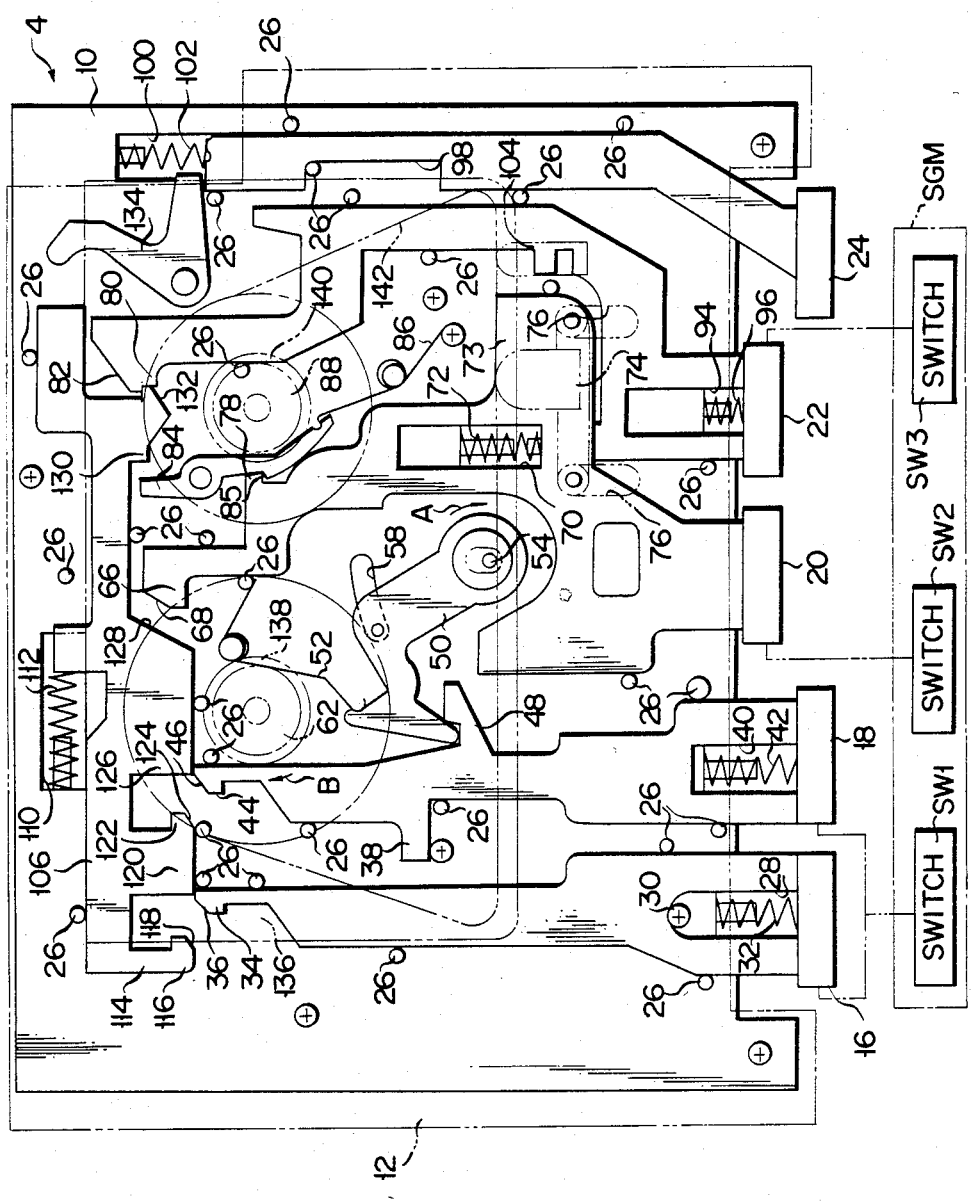
FIG. 5 is a plan view showing a state in which the pair of reel hubs of the tape cassette are mounted on the pair of reel shafts provided on the operating lever apparatus of FIG. 2, and a fourth operating lever serving as a recording lever is located in its second position.

The fourth operating lever 22 moving upward stops such upward movement when the lower end face of the fourth engaging portion 80 of the fourth control lever 22 engages the upper end face of the fourth hanging portion 130 of the second auxiliary operating lever 106, as shown in FIG. 5. The position of the fourth operating lever 22 in this state is defined as its second position. Further, the position of the second auxiliary operating lever 106 in FIG. 5, in which the fourth operating lever 22 is located in its second position, is defined as its third position or its holding position. The third position of the second auxiliary operating lever 106 is on the left of its second position.

The third slant face 68 of the third operating lever 20 being moved upward by the fourth operating lever 22 does not come into slide contact with the third auxiliary slant face of the second auxiliary operating lever 106. When the fourth operating lever 22 is located in its second position, the third operating lever 20 is also located in its second position. The left side face of the fourth hanging portion 130 of the second auxiliary operating lever 106 in its third position, as shown in FIG. 5, is opposed to the right side face of the one end of the first auxiliary operating lever 84 with a given horizontal space between them. When the third operating lever 20 is located in its second position, the second operating switch SW2 causes the electric motor to rotate the capstan 54 clockwise or in the direction of the arrow A of FIG. 5 at relatively low, constant speed. Then, as mentioned before, the magnetic recording tape 142 is wound on the first reel hub 138 after it is drawn out from the side of the second reel hub 140 by means of the capstan 54 and the pinch roller.

When the fourth operating lever 22 is located in its second position, as shown in FIG. 5, the erasing head 104 is in contact with the surface of the magnetic recording tape 142, and so is the magnetic head 74. When the fourth operating lever 22 is located in the second position, moreover, the third operating switch SW3 causes the magnetic head 74 to function as a recording head. When the fourth operating lever 22 is located in the second position, therefore, information collected through a microphone (not shown) of the tape recorder is recorded on the magnetic recording tape 142 by the magnetic head 74 as the tape 142 is run from the second reel hub 140 to the first reel hub 138 at a relatively low and constant speed. Thus, a recording mode is established in the tape recorder as the electric apparatus 6 provided with the operating lever apparatus 4 of this embodiment. This means that the fourth operating lever 22 functions as a recording lever in the tape recorder.

When the second auxiliary operating lever 106 is located in its third position, the upper end faces of the first and second operating levers 16 and 18 are vertically opposed to the lower end faces of the second and third hanging portions 120 and 126 of the second auxiliary operating lever 106, respectively, as shown in FIG. 5. When the tape recorder or the electric apparatus 6 with the operating lever apparatus 4 of this invention is set in the recording mode, therefore, neither of the first and second operating levers 16 and 18 can be located in its second position, since the upper end face of the first or second operating lever 16 or 18 will abut on the lower end face of the second or third hanging portion 120 or 126 if the operating lever is pressed upward. Thus, neither of the operating levers 16 and 18 can be shifted upward from its first position. In other words, neither of the fast-forward and fast rewinding modes can be established in the tape recorder when the tape recorder is set in the recording mode.

Figure 6:
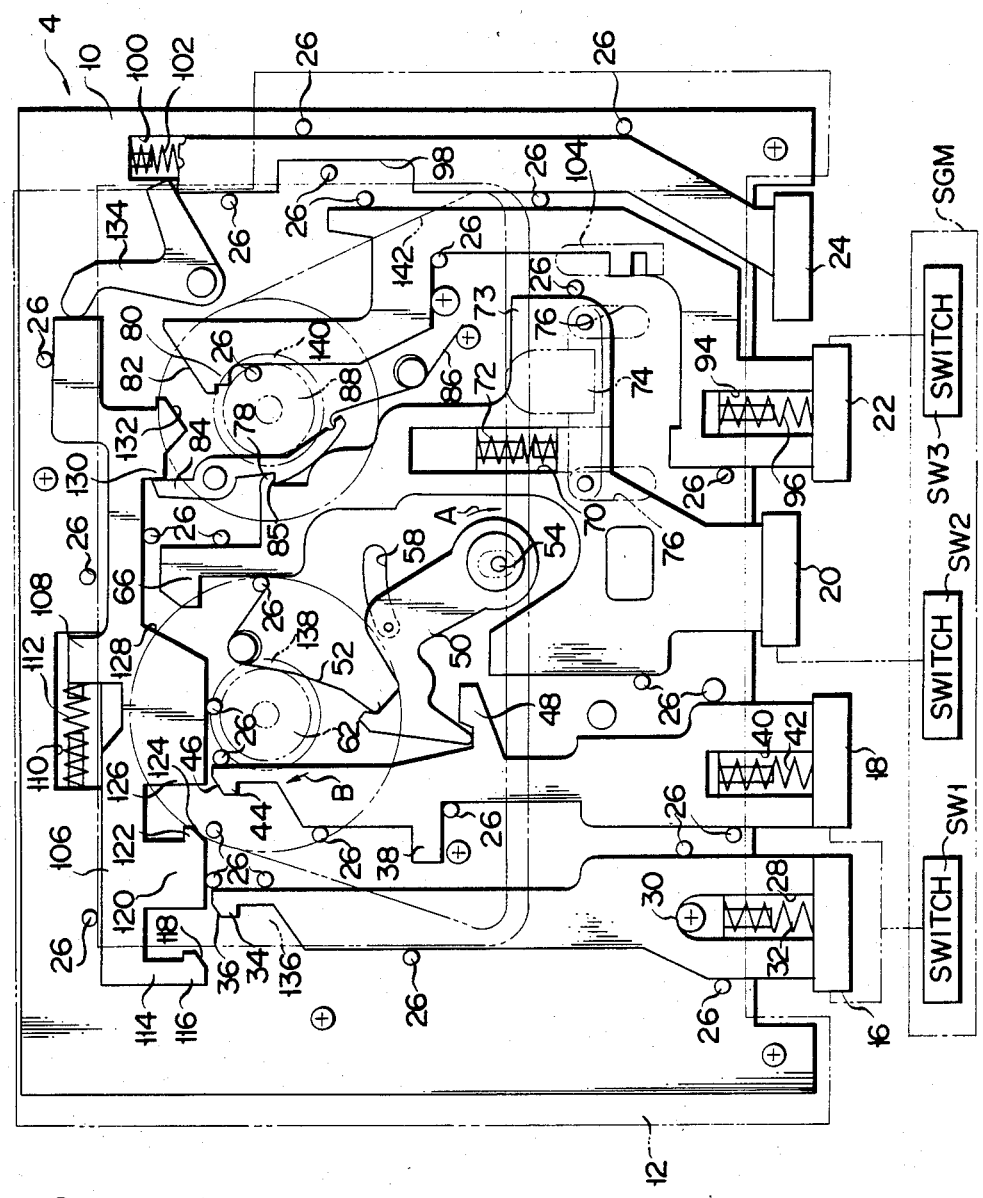
FIG. 6 is a plan view showing a state in which the fifth operating lever in the operating lever apparatus of FIG. 5 is being shifted from its first position to the second.

If the fifth operating lever 24 is pressed upward from its first position against the urging force of the urging means 102 when the third and fourth operating levers 20 and 22 are located in their respective second positions, the second auxiliary operating lever 106 is moved from its third position to the left against the urging force of the urging means 112 by the second rotating lever 134, as shown in FIG. 6. Then, the upper end face of the fourth hanging portion 130 of the second auxiliary operating lever 106 is disengaged from the lower end face of the fourth engaging portion 80 of the fourth operating lever 22 before the left side face of the fourth hanging portion 130 abuts on the right side face of the one end of the first auxiliary operating lever 84. The fourth operating lever 22 disengaged in this way is moved downward by the urging force of the urging means 96. The downward movement of the fourth operating lever 22 is stopped when the lower end face of the upper horizontally extending portion of the fourth operating lever 22 abuts on the guide projection 26, that is, when the fourth operating lever 22 is located in its first position, as shown in FIG. 6. At this time, the erasing head 104 is separated from the magnetic recording tape 142 of the tape cassette 136, as shown in FIG. 6. As the fourth operating lever 22 is shifted to its first position while the third operating lever 20 is kept in its second position, the magnetic head 47 comes to function as the reproducing head.

If the pressure on the fifth operating lever 24 is removed, the fifth operating lever 24 is moved downward by the urging force of the urging means 102, and stops when it is located in its first position. At the same time, the second auxiliary operating lever 106 is moved from its third position to the right against the urging force of the urging means 112. Such rightward movement of the second auxiliary operating lever 106 is stopped when the third auxiliary slant face 128 of the third hanging portion 126 abuts on the third slant face 68 of the third engaging portion 66 of the third operating lever 20 in its second position, that is, when the second auxiliary operating lever 106 is located in its second position, as shown in FIG. 3.

As is evident from FIG. 6, when the third operating lever 20 is located in its second position, the fourth operating lever 22 can be moved upward from its first position to be relocated in its second position. Namely, the electric apparatus or tape recorder in the playback mode can be switched directly to the recording mode without once establishing the stop mode therein.

There will now be summarized features of the functions of the tape recorder as the electric apparatus 6 provided with the operating lever apparatus 4 according to the above-mentioned embodiment of this invention.

When the third operating lever 20 serving as the playback lever is located in its second position, as shown in FIG. 3, the tape recorder can be switched directly to the fast-forward or fast rewinding mode without once establishing the stop mode therein. Also, in the same situation, the tape recorder can be set directly in the recording mode without once establishing the stop mode therein. When the tape recorder is in the recording mode, moreover, it can be switched directly to the playback mode without once establishing the stop mode therein.

The information previously recorded on the magnetic recording tape 142 can be surveyed by performing the playback operation concurrently with the fast-forward or fast rewinding operation. If any error is found to be involved in the information through such survey, a correct information is to be recorded on that section of the magnetic recording tape 142 which corresponds to the wrong information while performing a playback operation to identify the error section. After the recording, the survey of the previously recorded information can be resumed immediately.

Figure 7:
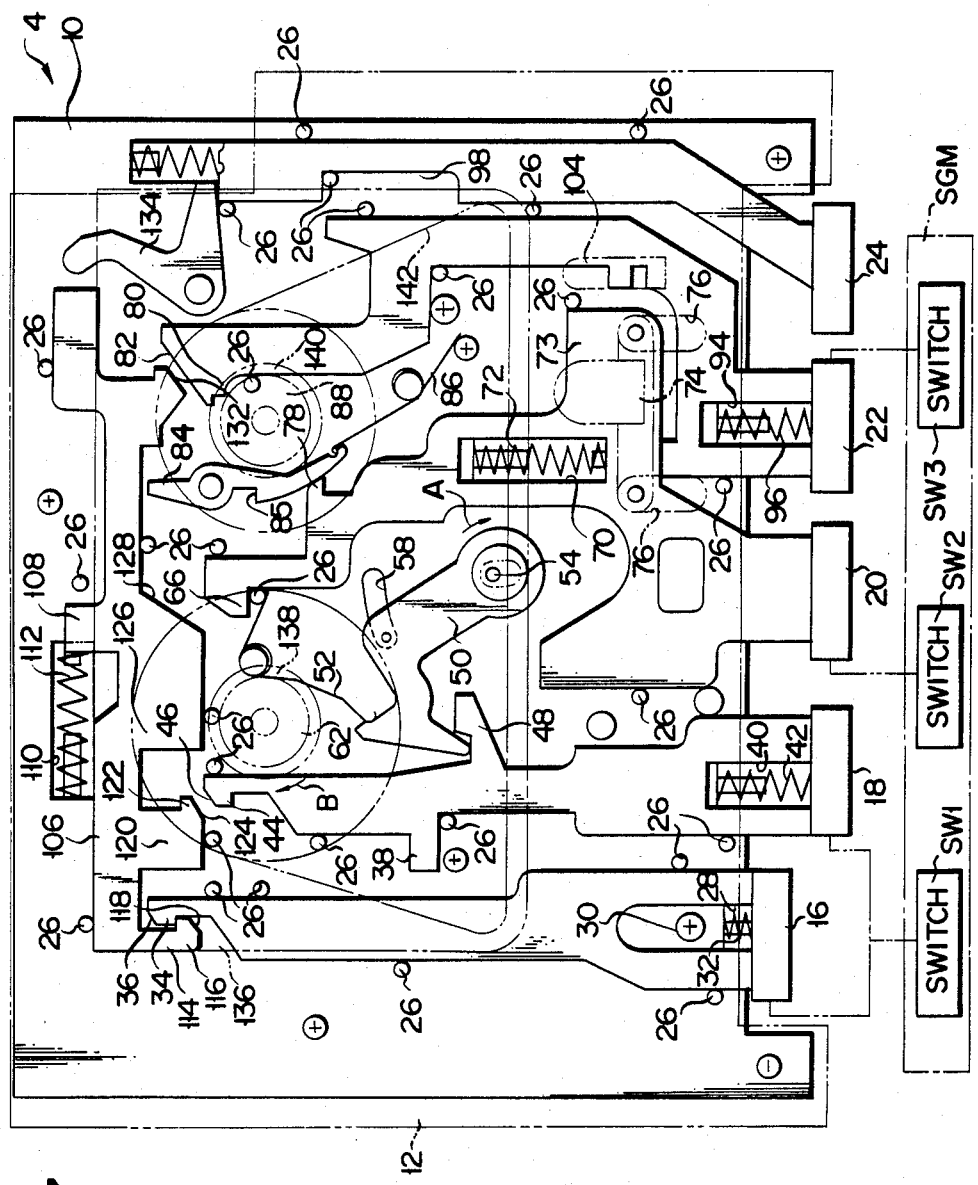
FIG. 7 is a plan view showing a state in which the pair of reel hubs of the tape cassette are mounted on the pair of reel shafts provided on the operating lever apparatus of FIG. 2, and a first operating lever serving as a fast-forward lever is located in its second position.

If the first operating lever 16 is pressed upward against the urging force of the urging means 32 when the first to fifth operating levers 16, 18, 20, 22 and 24 are located in their respective first positions, as shown in FIG. 2, the first slant face 36 of the first operating lever 16 comes into slide contact with the first auxiliary slant face 118 of the first hanging portion 114 of the second auxiliary operating lever 106, as shown in FIG. 7, thereby moving the second auxiliary operating lever 106 from its first position to the left against the urging force of the urging means 112. The first operating lever 16 ceases to move upward when the lower end face of the first engaging portion 34 of the first operating lever 16 engages the upper end face of the first engaged portion 116 of the first hanging portion 114 of the second auxiliary operating lever 106, as shown in FIG. 7. The position of the first operating lever 16 in this state is defined as its second position. The horizontal position of the auxiliary operating lever 106 of FIG. 7, in which the first operating lever 16 is located in its second position, is defined as its fourth position. When the first operating lever 16 is located in the second position, the fast-forward mode is established in the tape recorder, as mentioned before.

If the fifth operating lever 24 is pressed upward when the first operating lever 16 is located in its second position, as shown in FIG. 7, the second auxiliary operating lever 106 is moved from its fourth position to the left by the action of the second rotating lever 134. Then, the first engaged portion 116 of the second auxiliary operating lever 106 is disengaged from the first engaging portion 34 of the first operating lever 16, and the first operating lever 16 is returned to its first position by the urging force of the urging means 32. When the first operating lever 16 is returned to the first position, the tape recorder is released from the fast-forward mode.

If the second operating lever 18 is pressed upward against the urging force of the urging means 42 when the first to fifth operating levers 16, 18, 20, 22 and 24 are located in their respective first positions, as shown in FIG. 2, the second slant face 46 of the second operating lever 18 comes into slide contact with the second auxiliary slant face 124 of the second hanging portion 120 of the second auxiliary operating lever 106, thereby moving the second auxiliary operating lever 106 from its first position to the left against the urging force of the urging means 112. The second operating lever 18 ceases to move upward when the lower end face of the second engaging portion 44 of the second operating lever 18 engages the upper end face of the second engaged portion 122 of the second hanging portion 120 of the second auxiliary operating lever 106, as shown in FIG. 8. The position of the second operating lever 18 in this state is defined as its second position. The horizontal position of the auxiliary operating lever 18 of FIG. 8, in which the second operating lever 18 is located in its second position, is identical with its fourth position. When the second operating lever 18 is thus located in the second position, the fast rewinding mode is established in the tape recorder, as mentioned before.

If the fifth operating lever 24 is pressed upward when the second operating lever 18 is located in its second position, as shown in FIG. 8, the second auxiliary operating lever 106 is moved from its fourth position to the left by the action of the third rotating lever 134. Then, the second engaged portion 122 of the second auxiliary operating lever 106 is disengaged from the second engaging portion 44 of the second operating lever 18, and the second operating lever 18 is returned to its first position by the urging force of the urging means 42. When the second operating lever 18 is returned to the first position, the tape recorder is released from the fast rewinding mode.

When the second auxiliary operating lever 106 is located in its fourth position with the first operating lever 16 in its second position, as shown in FIG. 7, the second, third and fourth auxiliary slant faces 124, 128 and 132 of the second auxiliary operating lever 106 are vertically opposed to the second slant face 46 of the second operating lever 18 in its first position, the third slant face 68 of the third operating lever 20 in its first position, and the fourth slant face 82 of the fourth operating lever 22 in its first position, respectively. If one of the second, third and fourth operating levers 18, 20 and 22 is shifted from its first position to the second, therefore, the second slant face 46 and the second auxiliary slant face 124, the third slant face 66 and the third auxiliary slant face 128, or the fourth slant face 82 and the fourth auxiliary slant face 132 come into slide contact with each other, thereby causing the second auxiliary operating lever 106 to move from its fourth position to the left against the urging force of the urging means 112. At this time, the first engaged portion 116 of the second auxiliary operating lever 106 is disengaged from the first engaging portion 34 of the first operating lever 16, and the first operating lever 16 is returned to its first position by the urging force of the urging means 32. Thus, the fast rewinding, playback or recording mode can be established in the tape recorder directly after the fast-forward mode without once establishing the stop mode by locating the fifth operating lever 24 in its second position.

When the second auxiliary operating lever 106 is located in its fourth position with the second operating lever 18 in its second position, as shown in FIG. 8, the first, third and fourth auxiliary slant faces 118, 128 and 132 of the second auxiliary operating lever 106 are vertically opposed to the first slant face 36 of the first operating lever 16 in its first position, the third slant face 68 of the third operating lever 20 in its first position, and the fourth slant face 82 of the fourth operating lever 22 in its first position, respectively. Thus, the fast-forward, playback or recording mode can be established in the tape recorder directly after the fast rewinding mode without once establishing the stop mode by locating the fifth operating lever 24 in its second position.

What we claim is:

1. An operating lever apparatus for use in combination with a tape recorder which may be set to various modes, said operating lever apparatus comprising:
a first base plate;
a second base plate spaced from and disposed parallel to the first base plate;
a playback lever disposed between the first and second base plates and being slideably movable between a first position and a second position along and substantially parallel to the first and second base plates, said playback lever setting, upon arriving at its second position, the tape recorder to playback mode;
a recording lever disposed between the first and second base plates and being slideably movable between a first position and a second position along and substantially parallel to the first and second base plates, said recording lever setting, upon arriving at its second position, the tape recorder to recording mode;
a stop lever disposed between the first and second base plates and being slideably movable between a first position and a second position along and substantially parallel to the first and second base plates;
a first auxiliary lever disposed between the first and second base plates and being slideably movable between a first position and a second position along and substantially parallel to the first and second base plates, said first auxiliary lever including means for holding the playback lever in its second position while said first auxiliary lever remains at its first position and said first auxiliary lever releasing the playback lever upon said first auxiliary lever being moved to its second position; and
a second auxiliary lever disposed between the first and second base plates and being slideably movable between a holding position and a releasing position along and substantially parallel to the first and second base plates, said second auxiliary lever including means for holding the recording lever in its second position while said second auxiliary lever remains at its holding position, and said second auxiliary lever moving from its holding position to its releasing position responsive to said stop lever moving from its first position to its second position, thus releasing the recording lever from its second position and then moving the first auxiliary lever from its first position to its second position and finally releasing the playback lever from its second position.

2. An operating lever apparatus according to claim 1, wherein said second base plate is transparent.

3. An operating lever apparatus according to claim 1, further comprising:

holes formed in: at least one of the first base plate and the playback lever; the recording lever; and the stop lever; and
urging means in the holes for urging the playback lever, the recording lever, and the stop lever toward their respective first positions.

4. An operating lever apparatus according to claim 3, wherein said second base plate is transparent.

5. An operating lever apparatus according to claim 3, wherein each said urging means comprises a coil spring arranged to produce an axial urging force.

6. An operating lever apparatus according to claim 5, wherein said second base plate is transparent.

7. An operating lever apparatus according to claim 1, further comprising guide projections formed on at least one of the first and second base plates and arranged to come into slide contact with the respective outer peripheral surface of at least the playback lever, the recording lever, the stop lever, and the second auxiliary operating lever, thereby guiding at least the playback lever, the recording lever, the stop lever, and the second auxiliary operating lever in their respective movements between the first and second positions thereof or between the holding and releasing positions thereof.

8. An operating lever apparatus according to claim 7, wherein said second base plate is transparent.

9. An operating lever apparatus according to claim 7, wherein said guide projections comprise extrusion-molded members on at least one of the first and second base plates.

10. An operating lever apparatus according to claim 9, wherein said second base plate is transparent.

11. An operating lever apparatus according to any one of claims 1-10, wherein:
said playback lever, recording lever and stop lever are movable in the same direction from their first position to their second position and vice versa;
said second auxiliary lever is movable between its holding position and its releasing position in a direction intersecting with the direction in which said playback, recording and stop levers move; and
said first auxiliary lever is rotatable, with one end thereof being movable along a path which intersects with the direction in which said second auxiliary lever moves.

12. An operating lever apparatus according to claim 11, wherein the playback lever, the recording lever, and the stop lever are movable along the same direction between their respective first and second positions as the direction of forces to be applied to the playback lever, the recording lever, and the stop lever to shift the same.

13. An operating lever apparatus according to claim 1, wherein:
the tape recorder is settable to respective different operation modes, including a playback mode and a recording mode, in accordance with respective electrical signals, the tape recorder including a signal generating means which is responsive to operation of at least said playback lever and said recording lever to produce said electrical signals;
the playback lever causes, upon arriving at its second position, the signal generating means to generate a first electrical signal for setting the tape recorder to the playback mode thereof; and
the recording lever causes, upon arriving at its second position, the signal generating means to generate a second electrical signal for setting the tape recorder to the recording mode thereof.

14. An operating lever apparatus according to claim 1, wherein the spacing between said first and second plates is substantially equal to the thickness of said levers in a direction perpendicular to said first and second base plates.

15. An operating lever apparatus according to claim 1, further comprising guide means provided on at least one of said first and second base plates for guiding said levers in their respective movements between the respective positions thereof, said guide means engaging peripheral portions of said operating levers, said operating levers having no holes or openings therein for engaging said guide means.

* * * * *